Apr. 24, 1923.
E. CAPOUCH
ENGINE CRANKING DEVICE
Filed June 23, 1921
1,452,592
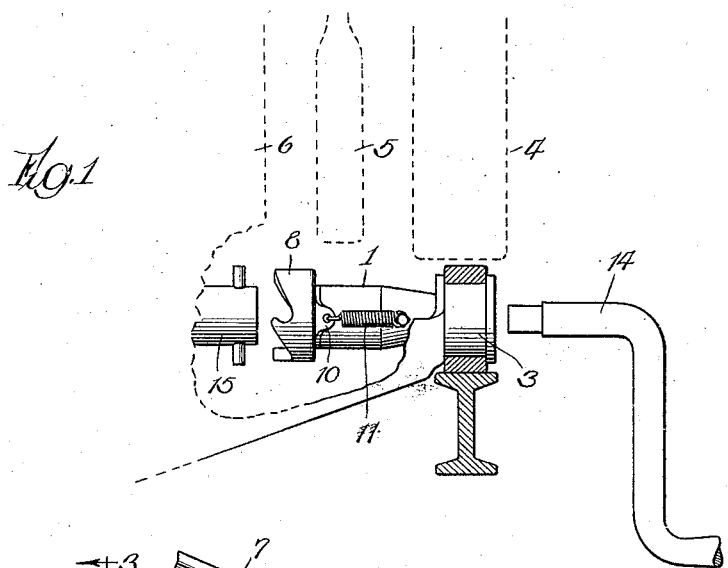
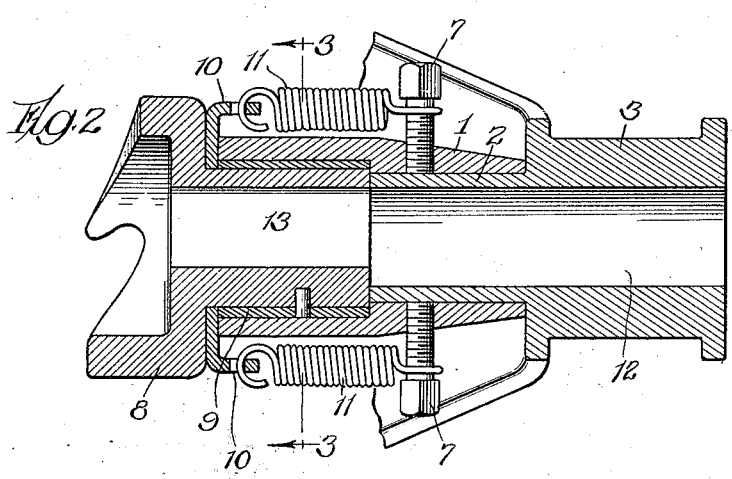
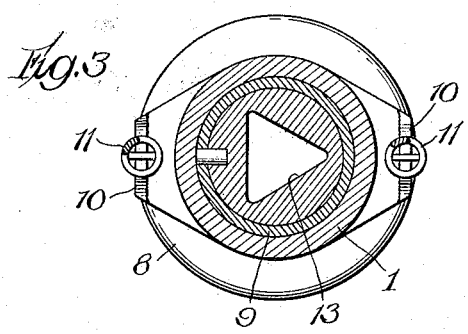
Inventor
Emil Capouch
By Arthur F. Durand
Atty.

Patented Apr. 24, 1923.

1,452,592

UNITED STATES PATENT OFFICE.

EMIL CAPOUCH, OF CICERO, ILLINOIS.

ENGINE-CRANKING DEVICE.

Application filed June 23, 1921. Serial No. 479,873.

*To all whom it may concern:*

Be it known that I, EMIL CAPOUCH, a citizen of the United States, and a resident of Cicero, Cook County, Illinois, have invented a certain new and useful Improvement in Engine-Cranking Devices, of which the following is a specification.

This invention relates to cranking devices for automobile or any other internal combustion engine.

Generally stated, the object of the invention is to provide an improved construction and arrangement whereby the crank is insertable in the device and then removable therefrom after the engine is started.

More specificially considered, the object of the invention is to provide a construction whereby the cranking device with a detachable crank may be applied to a motor vehicle having an ordinary non-removable crank, by utilizing the means for supporting the ordinary cranking device, so that the ordinary device with its non-removable crank can be removed, and the device with the removable crank installed in place thereof.

To these and other useful ends, the invention consists in matters hereinafter set forth and claimed and shown in the accompanying drawings in which:

Figure 1 is a side elevation of a cranking device embodying the principles of the invention.

Figure 2 is an enlarged longitudinal section of said device.

Figure 3 is a section on line 3—3 in Figure 2.

As thus illustrated, the invention comprises a sleeve 1 adapted to slide over the cylindrical boss 2 ordinarily found on certain motor cars. This boss supports the ordinary cranking device, and is utilized to support the elements of the device embodying the invention. This boss is on the rear side of the support 3 of the motor vehicle, with the radiator 4 and fan 5 and engine 6 (indicated in dotted lines) in their usual positions. The sleeve 1 is removably secured in place on the boss 2 by means of set screws 7, or in any suitable manner. The clutch member 8 has a fixed sleeve 9 which rotates in the bearing formed by the sleeve 1, a loose yoke 10 being held on said member by said sleeve. Springs 11 connect said screws 7 with the ends of said yoke, so that the member 8 is yieldingly held against endwise displacement in said sleeve 1 by said springs. The opening 12 in the support 3 and the boss 2 is in alinement with the opening 13 in the member 8, and the crank 14 can be inserted through the opening 12 into the opening 13 to turn the member 8 in the usual manner. The crank 14 is made to fit the opening 13, it will be seen, so that after the clutch member 8 is displaced endwise to engage the other clutch member 15 on the engine shaft, the crank can then be rotated to start the engine. The springs 11 react, of course, to draw the clutch member back into normal position after the engine is started.

Thus it will be seen that a very simple and reliable construction is provided for replacing a non-removable crank with a removable crank. The invention is not limited to any particular vehicle, but is especially adapted to use on Fords, as on the latter the said boss 2 is found, and for some purposes it is desirable to replace the ordinary cranking device found on these cars with one having a crank which can be inserted and then removed after starting the engine.

It will be seen that the crank has interlocking connection with the member 8 before any displacement of the latter occurs, so that the axial displacement necessary to close the clutch takes place after the crank is firmly seated in this clutch member, and after the crank has interlocking connection therewith of a character to turn said member.

What I claim as my invention is:

1. In a clutch device for cranking internal combustion engines, the combination of a clutch member, means to support said member for axial displacement to close the clutch, and a crank insertable in said member and removable therefrom after starting the engine, and springs to hold said member in normal position, said member having a sleeve fixed thereon and a yoke held in place on said member by said sleeve and the ends of the yoke being attached to said springs.

2. In a clutch device for cranking internal combustion engines, the combination of a clutch member, means to support said member for axial displacement to close the clutch, and a crank insertable in said member and removable therefrom after starting the engine, said means comprising a cylindrical boss, a sleeve mounted on said boss and forming a bearing for said member, a set screw to secure the sleeve on the boss, and spring means to hold the member in normal position in said sleeve.

3. In an engine cranking device, the combination of a cylindrical boss having an opening therein, a sleeve on said boss, means to detachably hold the sleeve on the boss, a clutch member rotably mounted in said sleeve, a spring to yieldingly hold said member against endwise displacement in the sleeve, and a crank insertable through said opening into said member and removable therefrom after starting the engine.

4. A structure as specified in claim 3, having a yoke (10) to connect the spring (11 and 11) with said member.

5. A structure as specified in claim 3, having a support (3) for said boss, forming a guide for the insertion of the crank in said opening.

6. A structure as specified in claim 3, and means (15) to be engaged by the endwise displacement of said member by the insertion of the crank.

EMIL CAPOUCH.